(12) United States Patent
Sakurai

(10) Patent No.: US 10,186,696 B2
(45) Date of Patent: Jan. 22, 2019

(54) POWER STORAGE MODULE

(71) Applicant: HONDA MOTOR CO., LTD., Tokyo (JP)

(72) Inventor: Atsushi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 14/996,229

(22) Filed: Jan. 15, 2016

(65) Prior Publication Data
US 2016/0240827 A1 Aug. 18, 2016

(30) Foreign Application Priority Data
Feb. 12, 2015 (JP) .................................. 2015-025236

(51) Int. Cl.
*H01M 2/10* (2006.01)
*H01M 2/20* (2006.01)
*H01M 10/0525* (2010.01)

(52) U.S. Cl.
CPC ......... *H01M 2/1077* (2013.01); *H01M 2/206* (2013.01); *H01M 10/0525* (2013.01); *H01M 2220/20* (2013.01); *Y02E 60/122* (2013.01)

(58) Field of Classification Search
None
See application file for complete search history.

(56) References Cited

U.S. PATENT DOCUMENTS

2010/0190049 A1* 7/2010 Kawase ............. H01M 2/1077
429/159
2014/0011059 A1* 1/2014 Hashimoto ......... H01M 2/1077
429/72
2014/0287286 A1* 9/2014 Miyawaki ........... H01M 2/1077
429/90

FOREIGN PATENT DOCUMENTS

| JP | 2003-297389 | 10/2003 |
|----|-------------|---------|
| JP | 2004-227788 | 8/2004 |
| JP | 2007-287364 | 11/2007 |
| JP | 2012-134094 | 7/2012 |
| JP | 2012-230832 | 11/2012 |

OTHER PUBLICATIONS

Japanese Office Action for corresponding JP Application No. 2015-025236, dated Nov. 20, 2018 (w/ English machine translation).

* cited by examiner

*Primary Examiner* — Wojciech Haske
(74) *Attorney, Agent, or Firm* — Mori & Ward, LLP

(57) ABSTRACT

A power storage module includes a storage battery bank, a first end plate, a second end plate, and a connection bar. The storage battery bank includes storage batteries stacked in a stacking direction. The first end plate is provided at a first end of the storage battery bank and includes an outer metal plate and an inner metal plate. The inner metal plate is provided between the storage battery bank and the outer metal plate in the stacking direction. The inner metal plate has at least one recess portion and at least one protrusion portion which contacts the outer metal plate. The connection bar extends in the stacking direction and connects the second end plate and the outer metal plate of the first end plate. The outer metal plate includes a protruding end portion that protrudes with respect to the inner metal plate toward the connection bar.

22 Claims, 5 Drawing Sheets

POWER STORAGE MODULE

CROSS-REFERENCE TO RELATED APPLICATIONS

The present application claims priority under 35 U.S.C. § 119 to Japanese Patent Application No. 2015-025236, filed Feb. 12, 2015, entitled "Power Storage Module." The contents of this application are incorporated herein by reference in their entirety.

BACKGROUND

1. Field

The present disclosure relates to a power storage module.

2. Description of the Related Art

Generally, a power storage module including a storage battery bank (a battery module) in which a plurality of storage batteries (battery cells) are stacked is known. Since the above power storage module is mounted in a hybrid vehicle or a motor-driven vehicle such as an EV, for example, a number of storage batteries need to be mounted in the vehicle in a robust and reliable manner.

As such a type of power storage module, a battery pack disclosed in Japanese Unexamined Patent Application Publication No. 2012-230832 is known, for example. In the above battery pack, a pair of end plates that hold the battery pack therebetween are disposed at two end portions of the battery pack, which is stacked with a plurality of single cells, in the stacking direction, and restriction bands that extend in the stacking direction and that restrict the battery pack are provided.

Pairs of plate portions that hold the restriction bands therebetween are provided in the pair of end plates. Furthermore, by having the pairs of plate portions be connected to each other with rivets, clamping pressure that clamps the restriction bands is applied to the pairs of plate portions.

SUMMARY

According to one aspect of the present invention, a power storage module includes a storage battery bank, end plates, and a connection bar. In the storage battery bank, a plurality of storage batteries are stacked. The end plates are provided at the two ends of the storage battery bank in a stacking direction. The connection bar extends in the stacking direction and connects the end plates to each other. The end plates each include a plurality of metal plate members. The plurality of metal plate members form a closed cross section with contact portions that overlap each other in the stacking direction. Outer metal plate members of the metal plate members each include, at least at the contact portions, a protruding end portion that protrudes, with respect to a corresponding one of inner metal plate members of the metal plate members, in a direction facing the connection bar.

According to another aspect of the present invention, a power storage module includes a storage battery bank, a first end plate, a second end plate, and a connection bar. The storage battery bank includes storage batteries stacked in a stacking direction and has a first end and a second end opposite to the first end in the stacking direction. The first end plate is provided at the first end of the storage battery bank and includes an outer metal plate and an inner metal plate. The inner metal plate is provided between the storage battery bank and the outer metal plate in the stacking direction. The inner metal plate has at least one recess portion and at least one protrusion portion which contacts the outer metal plate. The second end plate is provided at the second end of the storage battery bank. The connection bar extends in the stacking direction and connects the second end plate and the outer metal plate of the first end plate. The outer metal plate includes a protruding end portion that protrudes with respect to the inner metal plate toward the connection bar.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
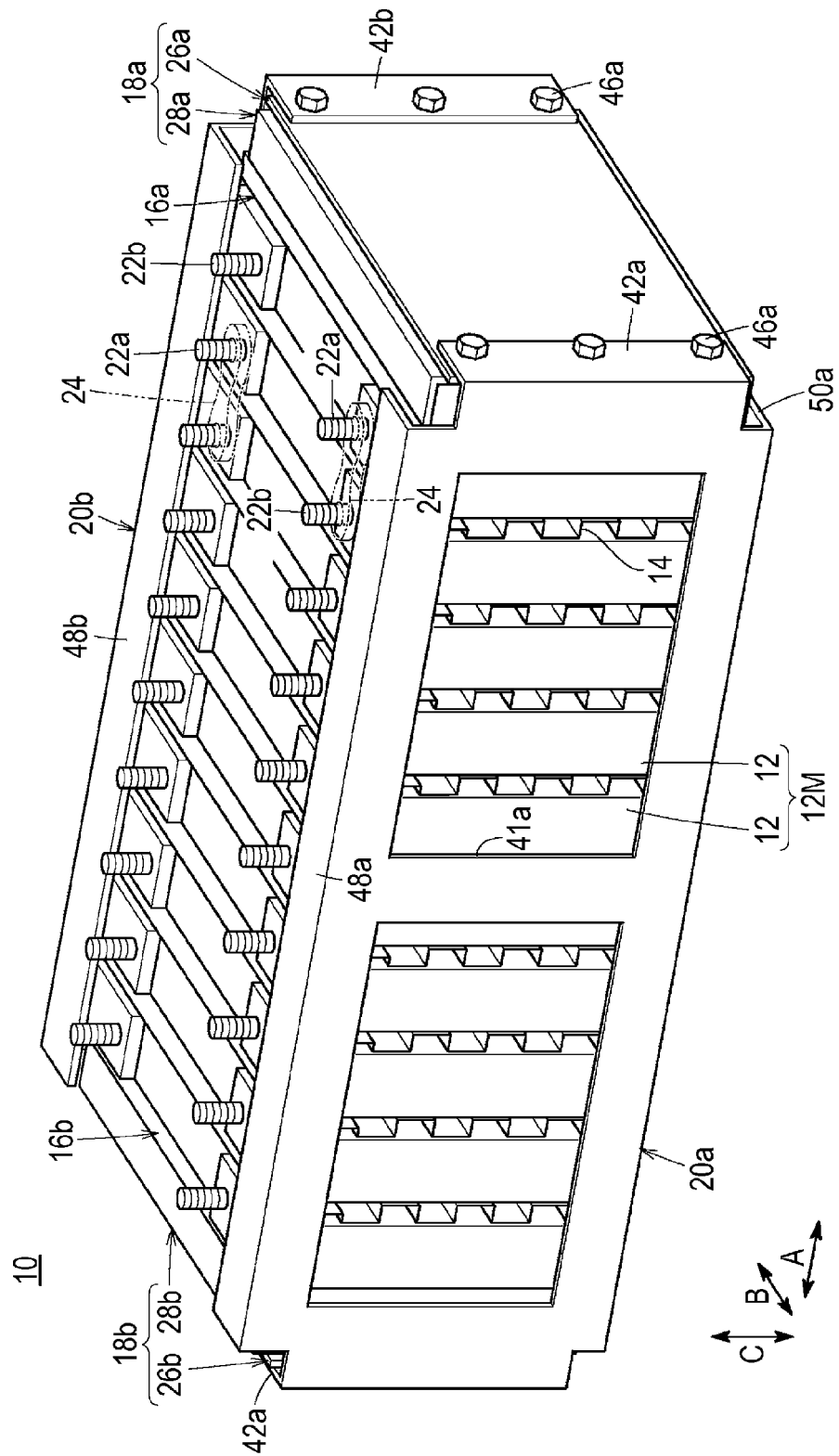
FIG. 1 is a schematic perspective view for describing a power storage module according to a first exemplary embodiment of the present disclosure.

The embodiments will now be described with reference to the accompanying drawings, wherein like reference numerals designate corresponding or identical elements throughout the various drawings.

Figure 2:
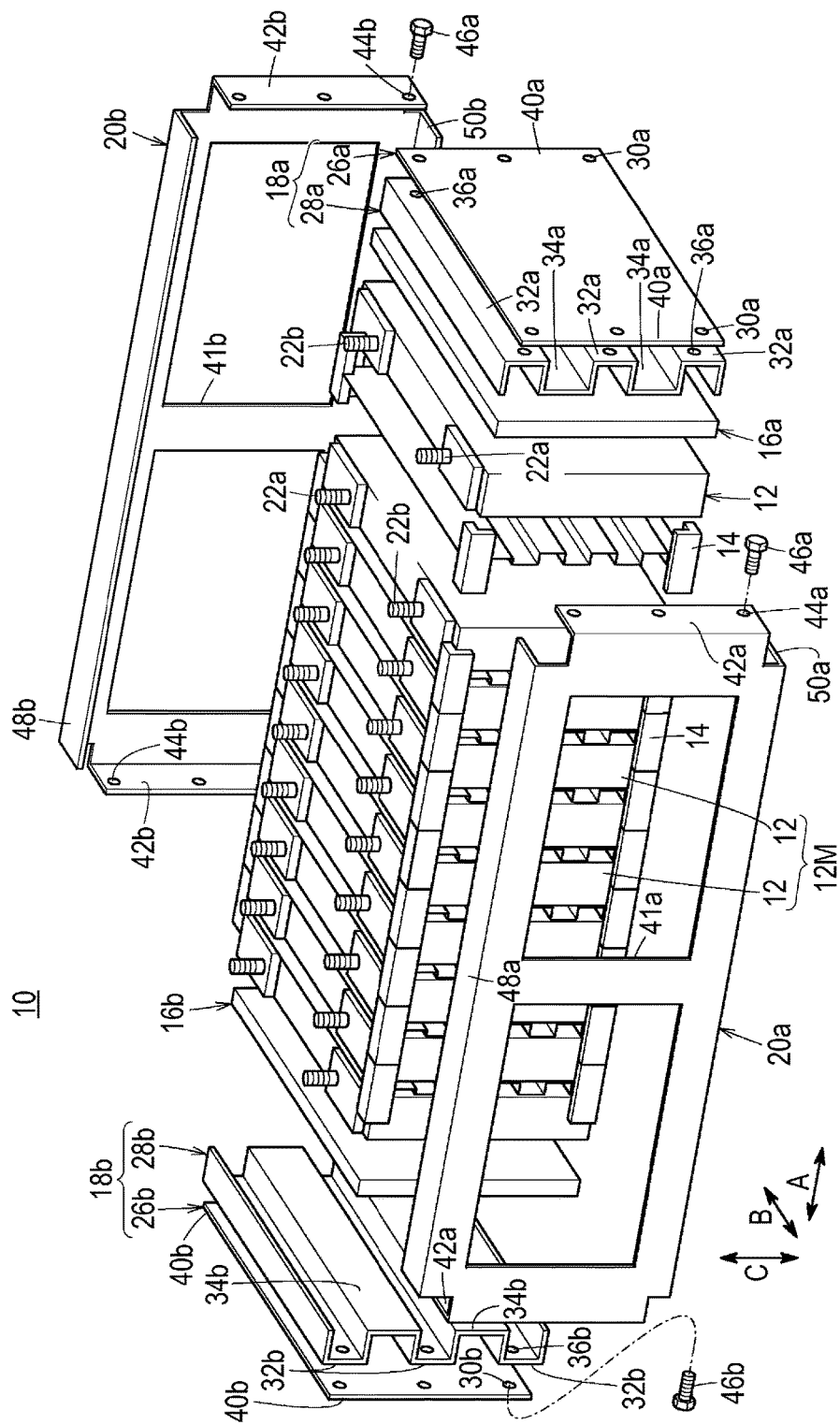
FIG. 2 is an exploded perspective view for describing the essential portions of the power storage module.

As illustrated in FIGS. 1 and 2, a power storage module 10 according to a first exemplary embodiment of the present disclosure is, for example, mounted in a hybrid car or a motor-driven vehicle such as an EV (not shown).

The power storage module 10 includes a storage battery bank (a battery module) 12M in which a plurality of storage batteries (battery cells) 12 are stacked in the horizontal direction (an arrow A direction). The storage batteries 12 each have a rectangular shape and, while being disposed in an upright position, are stacked alternately in the arrow A direction with separators (holders) 14 having an insulation property.

As illustrated in FIG. 2, rectangular (or square) end plates 18a and 18b are disposed at both ends of the storage battery bank 12M in the stacking direction while having insulator plates (or may be separators 14) 16a and 16b having an adiabatic function and an insulating function interposed therebetween. The end plates 18a and 18b are connected to each other with, for example, a pair of connection bars 20a and 20b that are disposed at both ends in an arrow B direction and that extend in the arrow A direction (see FIGS. 1 and 2).

Each storage battery 12 is, for example, a lithium-ion battery and has a rectangular (or a square) shape. A positive (or a negative) terminal 22a and a negative (or a positive) terminal 22b are provided on the upper surface of each of the storage batteries 12. Each of the terminal 22a and the terminal 22b of the storage batteries 12 that are adjacent to each other are connected with a bus bar 24 (see FIG. 1).

As illustrated in FIG. 2, by bending a thin resin plate in a wave-like form, each separator 14 is bent and formed in a waveform extending in the up-down direction in side view. The insulator plates 16a and 16b are each configured so as to have a substantially tabular shape (the shape may be the same as that of the separator 14), and detailed description thereof will be omitted.

Figure 3:
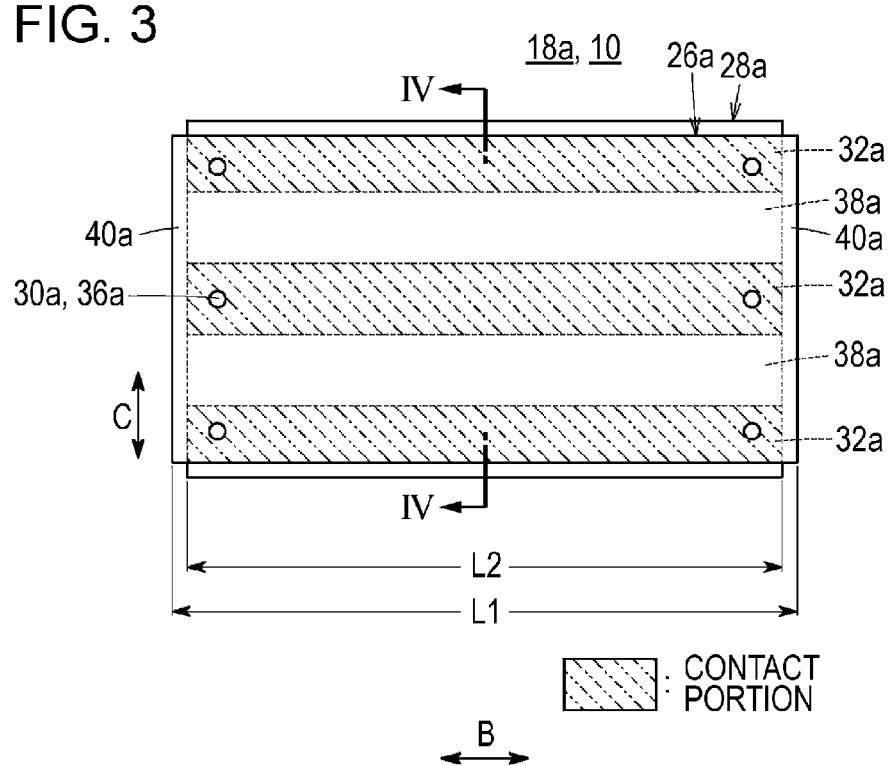
FIG. 3 is a front view for describing an end plate, viewed from the outside, constituting the power storage module.
Figure 4:
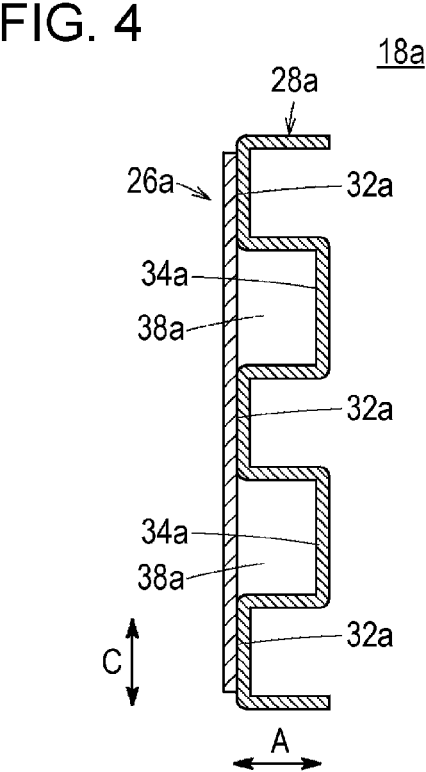
FIG. 4 is a cross-sectional view of the end plate taken along line IV-IV of FIG. 3.

As illustrated in FIGS. 2 to 4, the end plate 18a includes a plurality of, for example, two, metal plates, namely, an outer metal plate (a metal plate member on the outside) 26a and an inner metal plate (a metal plate member on the inside) 28a. The outer metal plate 26a and the inner metal plate 28a are integrated by welding, for example.

The outer metal plate 26a is formed in a substantially tabular shape and a plurality of, that is, three, hole portions 30a are formed in the up-down direction in each of the two edge portions in the arrow B direction. The inner metal plate 28a is formed in a substantially tabular shape. Protrusion portions 32a that protrude towards the outer metal plate 26a and recess portions 34a that are spaced apart from the outer metal plate 26a are formed alternately in the inner metal plate 28a. Protrusion portions 32a and recess portions 34a extend in the horizontal direction. There are three protrusion portions 32a and two recess portions 34a. A screw hole 36a is formed in each of the two edge portions of each protrusion portion 32a in the horizontal direction, and each screw hole 36a is disposed coaxially with the corresponding hole portion 30a.

As illustrated in FIG. 4, closed cross sections 38a are formed by contact portions that are the protrusion portions 32a of the inner metal plate 28a and the outer metal plate 26a overlapping each other in the stacking direction. As illustrated in FIG. 3, at least at the contact portions, the outer metal plate 26a includes protruding end portions 40a and 40a that protrude, with respect to the inner metal plate 28a, in the horizontal direction, in other words, in a direction facing the connection bars 20a and 20b. A dimension L1 of the outer metal plate 26a in the arrow B direction is set longer than the dimension L2 of the inner metal plate 28a in the arrow B direction (L1>L2). Note that the end plate 18b is configured in a similar manner to the configuration of the end plate 18a described above; accordingly, the same components are attached with the same reference numerals while reference signs b are attached in place of reference signs a and detailed description of the components is omitted.

As illustrated in FIGS. 1 and 2, the connection bar 20a is formed of a laterally long sheet metal (a metal plate) and, for example, openings 41a for reducing weight and for introducing a coolant for cooling the storage batteries 12 are formed therein as required. When viewed from the front, that is, from one end in the stacking direction of the storage battery bank 12M, the connection bar 20a has a U-shaped section. Bended end portion 42a at each end portion of the connection bar 20a in the longitudinal direction (in the direction of the long side) covers a corresponding one of the short sides of the end plates 18a and 18b. The bended end portions 42a each constitute a connection bar side bend portion that is bent towards the principal surface side.

A plurality of, for example, three, hole portions 44a are formed in the up-down direction in each of the bended end portions 42a. Each of the hole portions 44a are disposed coaxially with the corresponding one of the hole portions 30a and 30b of the end plates 18a and 18b and the corresponding one of the screw holes 36a and 36b of the end plates 18a and 18b. Screws 46a being inserted into the corresponding hole portions 44a and 30a and being screwed to the screw holes 36a fix one of the bended end portions 42a of the connection bar 20a and the end plate 18a to each other. Screws 46b being inserted into the corresponding hole portions 44b and 30b and being screwed to the screw holes 36b fix the other one of the bended end portions 42a of the connection bar 20a and the end plate 18b to each other.

An upper bend portion 48a and a lower bend portion 50a that are each bent horizontally inwards after extending in the vertical direction are provided in the two upper and lower ends of the connection bar 20a. The bend portions 48a and 50a extend in the stacking direction of the storage battery bank 12M. The bend portion 48a holds an upper corner of the storage battery bank 12M and the bend portion 50a holds a lower corner of the storage battery bank 12M.

The connection bar 20b is configured in a similar manner to the configuration of the connection bar 20a described above; accordingly, the same components are attached with the same reference numerals while reference signs b are attached in place of reference signs a and detailed description of the components is omitted.

Figure 5:
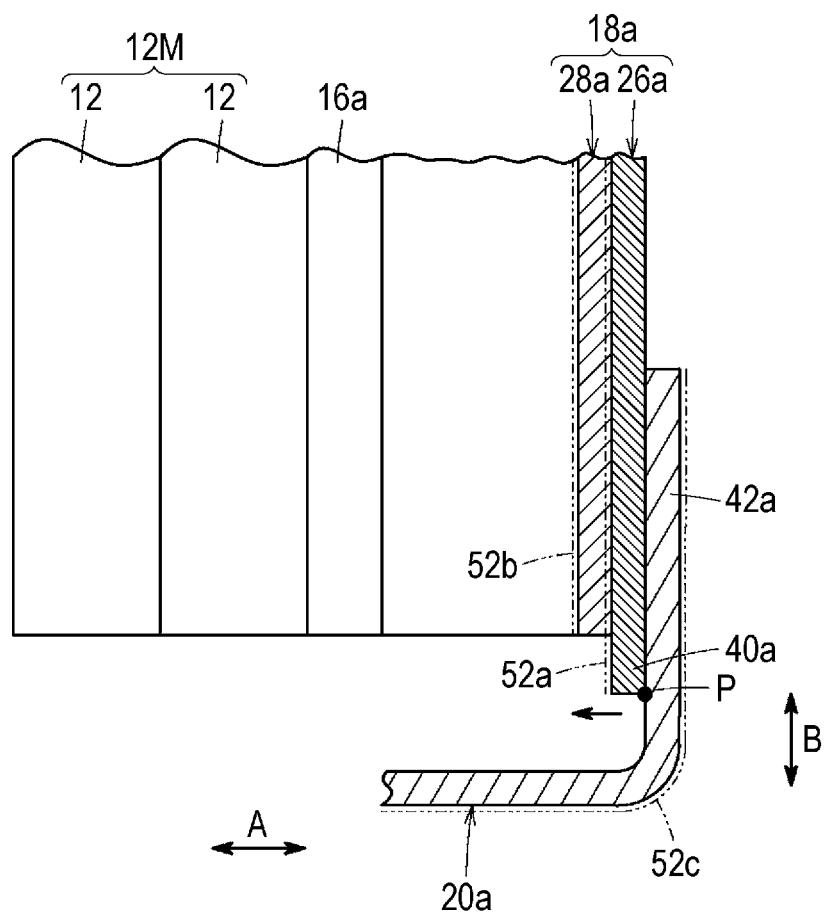
FIG. 5 is a cross-sectional view for describing one edge portion of the power storage module.

As illustrated in FIG. 5, in the end plate 18a, burrs 52a and 52b formed during molding the outer metal plate 26a and the inner metal plate 28a are disposed so as to be oriented towards the inner side of the storage battery bank 12M. A burr 52c formed on the connection bar 20a during molding is disposed so as to be oriented towards the outer side of the storage battery bank 12M.

When manufacturing the power storage module 10 configured in the above manner, the plurality of storage batteries 12 are stacked and the end plates 18a and 18b are disposed on the two ends in the stacking direction while interposing the insulator plates 16a and 16b with the storage batteries 12. Furthermore, the bended end portions 42a and 42b of the pair of connection bars 20a and 20b are fixed to the end plates 18a and 18b with the screws 46a and 46b (see FIGS. 1 and 2).

In the above case, in the first exemplary embodiment, as illustrated in FIG. 3, at least in the contact portions of the end plate 18a, the outer metal plate 26a includes the protruding end portion 40a that protrudes with respect to the inner metal plate 28a in the direction (the arrow B direction) that faces the connection bar 20a. Accordingly, the end plate 18a is capable of reducing the rigidity of only the protruding end portion 40a of the outer metal plate 26a.

Now, when the storage batteries 12 swell due to deterioration and load increases in the stacking direction of the storage battery bank 12M, as illustrated in FIG. 5, a load concentrating portion P tends to be formed in the edge portion of each protruding end portion 40a. With the above, as the load in the stacking direction increases, the protruding end portion 40a that has low rigidity is capable of being deformed along the bended end portion 42a of the connection bar 20a.

With the above, the outer metal plate 26a and the connection bar 20a can avert being in line contact with each other and can maintain a state of surface contact with each other; accordingly, an inexpensive material can be applied to the connection bar 20a. Accordingly, an effect such as creation of local stress being reliably prevented with a simple and economical configuration can be obtained.

Furthermore, in the first exemplary embodiment, the burr 52a of the outer metal plate 26a is disposed so as to be oriented towards the inner side of the storage battery bank 12M while the burr 52c of the connection bar 20a is disposed so as to be oriented towards the outer side of the storage battery bank 12M. Accordingly, when the outer metal plate 26a and the bended end portion 42a of the connection bar 20a are in contact with each other in the stacking direction, the burrs 52a and 52c thereof do not come in contact with each other.

With the above, jamming between the burrs 52a and 52c in a portion where the thickness restriction load is transmitted from the end plate 18a to the connection bar 20a does not occur. Accordingly, a decrease in dimensional accuracy during assembly can be prevented and secular distortion of the burrs 52a and 52c due to occurrence of local stress can be suppressed such that decrease in axial force between the connection bar 20a and the fastened portion can be prevented. Accordingly, reduction in cost, improvement in dimensional accuracy, and improvement in structural reliability can be facilitated.

Figure 6:
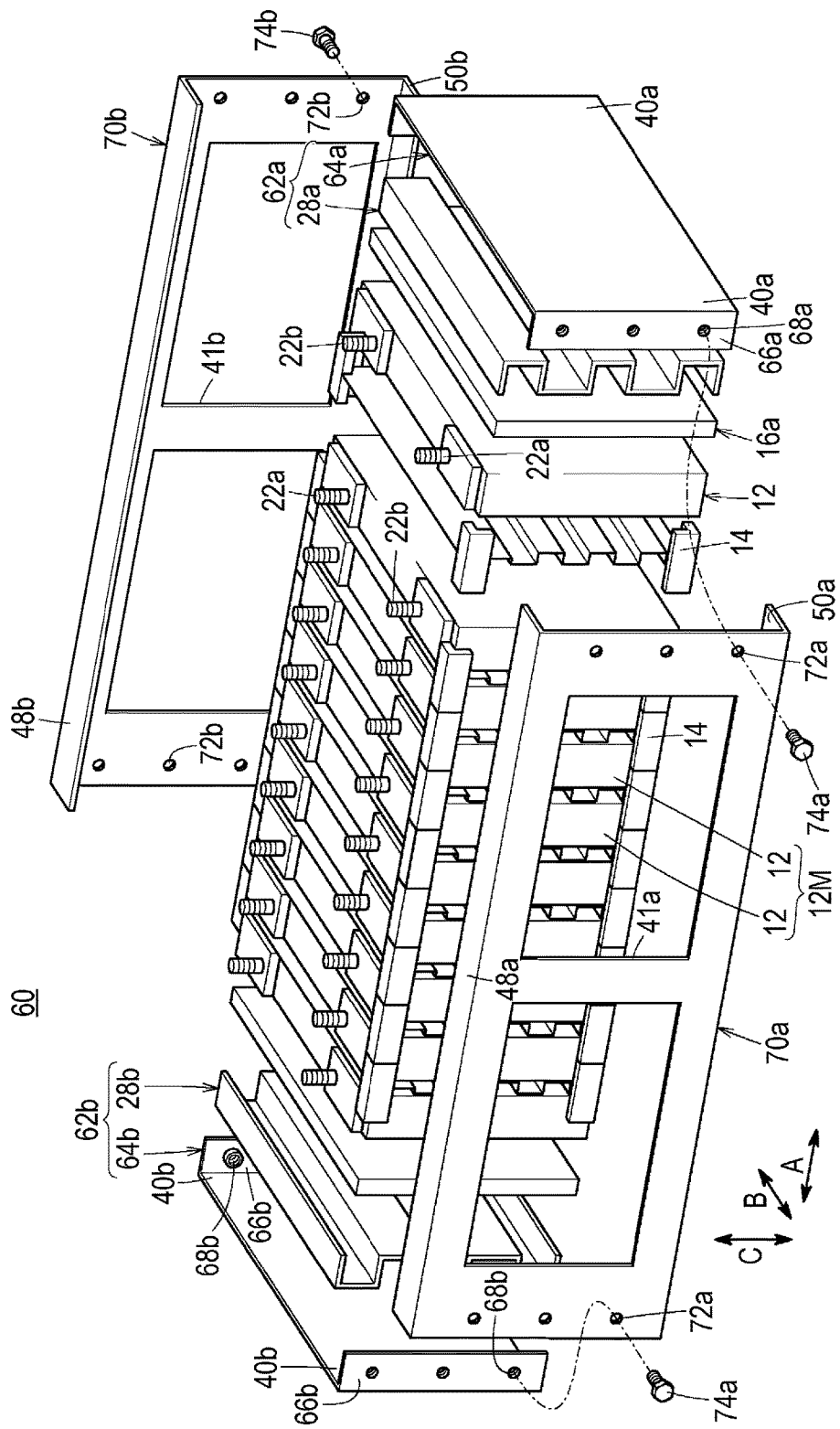
FIG. 6 is an exploded perspective view for describing an essential portion of a power storage module according to a second exemplary embodiment of the present disclosure.

FIG. 6 is an exploded perspective view for describing an essential portion of a power storage module 60 according to a second exemplary embodiment of the present disclosure. Note that components that are the same as those of the power storage module 10 according to the first exemplary embodiment will be attached with the same reference numerals and detailed description thereof is omitted.

The power storage module 60 includes end plates 62a and 62b. The end plate 62a includes a plurality of, for example, two metal plates, namely, an outer metal plate (a metal plate member on the outside) 64a and an inner metal plate 28a. The outer metal plate 64a includes bended end portions (end plate side bend portions) 66a that are bent in the stacking direction at the protruding end portions 40a that protrude with respect to the inner metal plate 28a. A plurality of, for example, three, screw holes 68a that penetrate each of the bended end portions 66a in an end plate principal surface direction are formed in the up-down direction.

Note that the end plate 62b is configured in a similar manner to the configuration of the end plate 62a described above; accordingly, the same components are attached with the same reference numerals while reference signs b are attached in place of reference signs a and detailed description of the components is omitted.

The power storage module 60 includes a pair of connection bars 70a and 70b that connect the end plates 62a and 62b to each other. The connection bars 70a and 70b are each formed of a laterally long sheet metal (a metal plate), and has a tabular shape extending in the arrow A direction. A plurality of, for example, three, hole portions 72a and 72b are formed in the up-down direction in the two edge portions of each of the connection bars 70a and 70b, respectively, in the longitudinal direction (the arrow A direction). Screws 74a and 74b are inserted into holes 72a and 72b and are screwed into screw holes 68a and 68b so as to fix the connection bars 70a and 70b and the end plates 62a and 62b to each other.

In the second exemplary embodiment configured in the above manner, at least in the contact portions of the end plates 62a and the 62b, the outer metal plates 64a and 64b include the protruding end portions 40a and 40b that protrude with respect to the inner metal plates 28a and 28b in the directions that face the connection bars 70a and 70b. Accordingly, an effect similar to the effect of the first exemplary embodiment such as creation of local stress being reliably prevented with a simple and economical configuration can be obtained.

Note that in the first exemplary embodiment, as illustrated in FIG. 4, a dimension of the outer metal plate 26a in an arrow C direction is shorter than a dimension of the inner metal plate 28a in the arrow C direction. Alternatively, the dimension of the outer metal plate 26a in the arrow C direction may be longer than the dimension of the inner metal plate 28a in the arrow C direction.

Accordingly, when the outer metal plate 26a and the inner metal plate 28a are made to overlap each other in a case where there is a burr of the outer metal plate 26a that faces the inner metal plate 28a, the burr of the outer metal plate 26a and the inner metal plate 28a do not overlap each other. With the above, jamming of the burr can be suppressed and the dimensional accuracy of the power storage module 10 is improved in a satisfactory manner. Note that same applies to the second exemplary embodiment.

A power storage module according to the present disclosure includes a storage battery bank in which a plurality of storage batteries are stacked, end plates that are provided at the two ends of the storage battery bank in a stacking direction, and a connection bar that extends in the stacking direction and that connects the end plates to each other.

The end plates include a plurality of metal plate members, and the plurality of metal plate members form a closed cross section with contact portions that overlap each other in the stacking direction. Furthermore, outer metal plate members of the metal plate members each include, at least at the contact portions, a protruding end portion that protrudes, with respect to a corresponding one of inner metal plate members of the metal plate members, in a direction facing the connection bar. Accordingly, the end plates are capable of reducing the rigidity of the end portions of only the outer metal plate members such that the end portions can be easily deformed by an increase in load in the stacking direction. Accordingly, the end plates and the connection bar can maintain a state of surface contact with each other; accordingly, an inexpensive material can be applied to the connection bar. With the above, creation of local stress can be reliably prevented with a simple and economical configuration.

Furthermore, the connection bar preferably includes, in end portions thereof in the stacking direction, connection bar side bend portions that are each bent towards a principal surface side of the corresponding end plate, and the end plates are preferably fixed to the connection bar side bend portions.

Furthermore, the outer metal plate members preferably include, in the protruding end portions thereof, end plate side bend portions that are bent in the stacking direction, and the connection bar is preferably fixed to the end plate side bend portions.

Furthermore, the inner metal plate members are each preferably provided with a plurality of protrusion portions or a plurality of recess portions that extend in a direction facing the connection bar.

Furthermore, in the plurality of metal plate members, burrs that are formed during molding the metal plate members are preferably disposed so as to be oriented towards an inside of the power storage module.

Furthermore, the burr formed on the connection bar during molding is preferably disposed towards the outer side of the power storage module.

Obviously, numerous modifications and variations of the present invention are possible in light of the above teachings. It is therefore to be understood that within the scope of the appended claims, the invention may be practiced otherwise than as specifically described herein.

What is claimed is:
1. A power storage module, comprising:
a storage battery bank in which a plurality of storage batteries are stacked;
end plates that are provided at the two ends of the storage battery bank in a stacking direction; and
a connection bar that extends in the stacking direction and that connects the end plates to each other, wherein the end plates each include a plurality of metal plate members, the plurality of metal plate members form a closed cross section with contact portions that overlap each other in the stacking direction, outer metal plate members of the metal plate members each include, at least at the contact portions, a protruding end portion that protrudes, with respect to a corresponding one of inner metal plate members of the metal plate members, in a direction facing the connection bar, the outer metal plate members each including a hole formed in one of the contact portions to receive a fastener to connect the outer metal plate member and the connection bar, and the connection bar has a portion that extends beyond the storage batteries in a direction orthogonal to the direction facing the connection bar and orthogonal to the stacking direction.

2. The power storage module according to claim 1, wherein the connection bar includes, in end portions thereof in the stacking direction, connection bar side bend portions that are each bent towards a principal surface side of the corresponding end plate, and the end plates are fixed to the connection bar side bend portions.

3. The power storage module according to claim 1, wherein the inner metal plate members are each provided with a plurality of protrusion portions that extend to contact flat portions of the outer metal plate members at the contact portions.

4. The power storage module according to claim 1, wherein in the plurality of metal plate members, burrs that are formed during molding the metal plate members are disposed so as to be oriented towards an inside of the power storage module.

5. The power storage module according to claim 1, wherein in the connection bar, a burr that is formed during molding the connection bar is disposed so as to be oriented towards an outside of the power storage module.

6. The power storage module according to claim 1, wherein the closed cross section has a rectangular shape formed between contact portions of the metal plate members and non-contact portions of the metal plate members.

7. The power storage module according to claim 1, wherein the connection bar includes an opening extending through the connection bar in the direction facing the connection bar.

8. The power storage module according to claim 1, wherein the portion of the connection bar that extends beyond the storage batteries is formed by a connection bar upper bend portion that is bent in the direction facing the connection bar.

9. The power storage module according to claim 8, wherein the portion of the connection bar that extends beyond the storage batteries holds an upper surface of the storage battery bank in the direction orthogonal to the direction facing the connection bar and orthogonal to the stacking direction.

10. The power storage module according to claim 1, wherein the inner metal plate members each include a hole disposed coaxially with respective ones of the holes of the outer metal plate members.

11. A power storage module, comprising:

a storage battery bank which includes storage batteries stacked in a stacking direction and which has a first end and a second end opposite to the first end in the stacking direction;

a first end plate provided at the first end of the storage battery bank and comprising:
an outer metal plate; and
an inner metal plate provided between the storage battery bank and the outer metal plate in the stacking direction, the inner metal plate having at least one recess portion and at least one protrusion portion which contacts the outer metal plate;

a second end plate provided at the second end of the storage battery bank; and a connection bar extending in the stacking direction and connecting the second end plate and the outer metal plate of the first end plate, the outer metal plate including a protruding end portion that protrudes with respect to the inner metal plate toward the connection bar, the outer metal plate including a hole formed so as to overlap a contact portion at which the at least one protrusion portion contacts the outer metal plate to receive a fastener to connect the outer metal plate member and the connection bar, the connection bar having a portion that extends beyond the storage batteries in a direction orthogonal to a direction in which the protruding end portion protrudes and orthogonal to the stacking direction.

12. The power storage module according to claim 11, wherein the connection bar includes, in a first end portion of the connection bar in the stacking direction, a first connection bar side bend portion that is bent towards a principal surface side of the first end plate, the connection bar includes, in a second end portion of the connection bar opposite to the first end portion in the stacking direction, a second connection bar side bend portion that is bent towards a principal surface side of the second end plate, the outer metal plate of the first end plate is fixed to the first connection bar side bend portion, and the second end plate is fixed to the second connection bar side bend portion.

13. The power storage module according to claim 11, wherein the at least one protrusion portion and the at least one recess portion extend in a direction toward the connection bar.

14. The power storage module according to claim 11, wherein in the outer and the inner metal plates, burrs that are formed during molding the outer and the inner metal plates are disposed so as to be oriented towards an inside of the power storage module.

15. The power storage module according to claim 11, wherein in the connection bar, a burr that is formed during molding the connection bar is disposed so as to be oriented towards an outside of the power storage module.

16. The power storage module according to claim 11, wherein
the protruding end portion of the outer metal plate protrudes with respect to the inner metal plate toward the connection bar at least at a position where the at least one protrusion portion of the inner metal plate contacts the outer metal plate.

17. The power storage module according to claim 11, wherein
the second end plate comprises an outer metal plate and an inner metal plate provided between the storage battery bank and the outer metal plate in the stacking direction,
the inner metal plate has at least one recess portion and at least one protrusion portion which contacts the outer metal plate,
the outer metal plate includes a protruding end portion that protrudes with respect to the inner metal plate toward the connection bar, and
the connection bar connects the outer metal plate of the second end plate and the outer metal plate of the first end plate.

18. The power storage module according to claim 11, wherein
the closed cross section has a rectangular shape formed between contact portions of the metal plate members and non-contact portions of the metal plate members.

19. The power storage module according to claim 11, wherein
the connection bar includes an opening extending through the connection bar in the direction in which the protruding end portion protrudes.

20. The power storage module according to claim 11, wherein
the portion of the connection bar that extends beyond the storage batteries is formed by a connection bar upper bend portion that is bent in the direction in which the protruding end portion protrudes.

21. The power storage module according to claim 20, wherein
the portion of the connection bar that extends beyond the storage batteries holds an upper surface of the storage battery bank in the direction orthogonal to the direction in which the protruding end portion protrudes and orthogonal to the stacking direction.

22. The power storage module according to claim 11, wherein
the inner metal plate includes a hole disposed coaxially with the hole of the outer metal plate.

* * * * *